US011054046B2

(12) United States Patent
Morgan et al.

(10) Patent No.: US 11,054,046 B2
(45) Date of Patent: Jul. 6, 2021

(54) VALVE WITH GRADUAL FLOW AREA CHANGES

(71) Applicant: Parker-Hannifin Corporation, Cleveland, OH (US)

(72) Inventors: Aaron Michael Morgan, Richfield, OH (US); Bipin Kashid, Elyria, OH (US); Charlie Seidel, Greenwich, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 283 days.

(21) Appl. No.: 16/337,954

(22) PCT Filed: Sep. 13, 2017

(86) PCT No.: PCT/US2017/051300
§ 371 (c)(1),
(2) Date: Mar. 29, 2019

(87) PCT Pub. No.: WO2018/125321
PCT Pub. Date: Jul. 5, 2018

(65) Prior Publication Data
US 2021/0131572 A1    May 6, 2021

Related U.S. Application Data

(60) Provisional application No. 62/440,419, filed on Dec. 30, 2016.

(51) Int. Cl.
*F16K 11/07* (2006.01)
*F16K 31/06* (2006.01)

(52) U.S. Cl.
CPC .......... *F16K 11/0712* (2013.01); *F16K 11/07* (2013.01); *F16K 31/0613* (2013.01); *Y10T 137/86879* (2015.04)

(58) Field of Classification Search
CPC ........ F16K 11/072; F16K 11/07; F16K 31/06; Y10T 137/86879
See application file for complete search history.

(56) References Cited

U.S. PATENT DOCUMENTS 3,323,549 A    6/1967 Carrington
4,753,264 A *  6/1988 Uchino .................... B62D 5/08
                                                    137/115.1
(Continued)

FOREIGN PATENT DOCUMENTS

JP    H 0356782    3/1991
JP    H 10 132096  5/1998

OTHER PUBLICATIONS

International Search Report prepared by the European Patent Office in International Application No. PCT/US2017/051300 dated Nov. 28, 2017.
(Continued)

*Primary Examiner* — Kevin R Barss
(74) *Attorney, Agent, or Firm* — McDonnell Boehnen Hulbert & Berghoff LLP

(57) ABSTRACT

An example valve includes: (i) a valve body defining a longitudinal cavity, where the valve body includes a supply inlet and an operating outlet; (ii) a cage disposed in the longitudinal cavity, where the cage includes (a) a first opening fluidly coupled to the supply outlet, and (b) a second opening fluidly coupled to the operating outlet; and (iii) a spool mounted within the cage and configured to move axially therein. When the valve is actuated, the spool moves within the cage to form a gap, thereby allowing pressurized fluid to flow from the supply inlet through the first opening, the gap, and the second opening to the operating outlet. A flow area defined around an exterior peripheral surface of the spool changes upstream from the gap at a first rate, and (Continued)

changes downstream from the gap at a second rate that is different from the first rate.

19 Claims, 5 Drawing Sheets

(56) References Cited

U.S. PATENT DOCUMENTS

| | | | | |
|---|---|---|---|---|
| 5,156,332 | A * | 10/1992 | Dyer | G05D 7/0126 |
| | | | | 137/468 |
| 6,776,191 | B2 | 8/2004 | Nakamura et al. | |
| 6,807,985 | B2 | 10/2004 | Stares et al. | |
| 7,104,283 | B2 | 9/2006 | Ino et al. | |
| 7,510,127 | B2 * | 3/2009 | Haji | F02M 57/025 |
| | | | | 239/88 |
| 9,404,599 | B2 | 8/2016 | Peterson et al. | |
| 2003/0024581 | A1 | 2/2003 | Nakamura et al. | |
| 2012/0006426 | A1 * | 1/2012 | Gorelic | F16K 1/443 |
| | | | | 137/468 |
| 2013/0153068 | A1 * | 6/2013 | West | F15B 13/0402 |
| | | | | 137/625.69 |
| 2015/0252908 | A1 | 9/2015 | Nagasaki et al. | |
| 2016/0103455 | A1 | 4/2016 | Bowden | |

OTHER PUBLICATIONS

Examiner's Report issued by the Canadian Patent Office in application No. 3,038,969 dated Apr. 17, 2020.

* cited by examiner

VALVE WITH GRADUAL FLOW AREA CHANGES

CROSS REFERENCE TO RELATED APPLICATION

This application claims priority to U.S. Patent Application No. 62/440,419, filed Dec. 30, 2016, which is incorporated herein by reference in its entirety.

BACKGROUND

Cavitation can occur within valves due to vaporization of liquid as a result of pressure and fluid velocity changes. Cavitation could cause wear of valve components, which affects performance of the valve. When valve performance changes, the valve or some of its components could be replaced to restore the proper performance level of the valve. In some applications, however, the valves are located in hazardous or remote locations such as subsea environments. In these applications, replacing or performing valve maintenance could be challenging. Therefore, it is desirable to have a valve that reduces wear resulting from cavitation, particularly wear of valve components that affect performance of the valve so as to avoid frequent maintenance or replacement of the valve.

SUMMARY

The present disclosure describes implementations that relate to a valve with gradual flow area changes. In a first example implementation, the present disclosure describes a valve. The valve includes: (i) a valve body defining a first longitudinal cavity therein, where the valve body comprises: (a) a supply annular groove configured to be fluidly coupled to a source of pressurized, fluid, and (b) an operating annular groove configured to be fluidly coupled to another valve, where the supply annular groove and the operating annular groove are disposed longitudinally on an exterior peripheral surface of the valve body; (ii) a cage disposed in the first longitudinal cavity coaxial with the valve body, where the cage includes (a) a first opening fluidly coupled to the supply annular groove, and (b) a second opening fluidly coupled to the operating annular groove, and where the cage defines a second longitudinal cavity therein; and (iii) a spool mounted within the second longitudinal cavity and configured to move axially therein, where when the valve is actuated, the spool moves within the second longitudinal cavity to form a gap between an exterior peripheral surface of the spool and an interior peripheral surface of the cage, thereby allowing the pressurized fluid to flow from the supply annular groove through the first opening, the gap, and the second opening to the operating annular groove, and where a profile of the exterior peripheral surface of the spool changes along a length of the spool such that a flow area defined around the exterior peripheral surface of the spool changes upstream from the gap toward the first opening at a first rate of change, and the flow area changes downstream from the gap toward the second opening at a second rate of change that is different from the first rate of change.

In a second example implementation, the present disclosure describes a valve. The valve includes: (i) a valve body defining a first longitudinal cavity therein, where the valve body comprises: (a) a supply annular groove configured to be fluidly coupled to a source of pressurized, fluid, and (b) an operating annular groove configured to be fluidly coupled to a hydraulic consumer, where the supply annular groove and the operating annular groove are disposed longitudinally on an exterior peripheral surface of the valve body; (ii) a first cage disposed in the first longitudinal cavity, where the first cage includes a first opening fluidly coupled to the supply annular groove; (iii) a second cage disposed longitudinally adjacent to the first cage in the first longitudinal cavity, where the second cage includes a second opening fluidly coupled to the operating annular groove, and where the first cage and the second cage define a second longitudinal cavity therein and extending therebetween; and (iv) a spool mounted within the second longitudinal cavity and configured to move axially therein, where when the valve is actuated, the spool moves within the second longitudinal cavity to form a gap between an exterior peripheral surface of the spool and an interior peripheral surface of the first cage, thereby allowing the pressurized fluid to flow from the supply annular groove through the first opening, the gap, and the second opening to the operating annular groove, and where a profile of the exterior peripheral surface of the spool changes along a length of the spool such that a flow area defined around the exterior peripheral surface of the spool changes upstream from the gap toward the first opening at a first rate of change, and the flow area changes downstream from the gap toward the second opening at a second rate of change that is different from the first rate of change.

In a third example implementation, the present disclosure describes a hydraulic system. The hydraulic system includes: (i) an actuator; (ii) a main valve configured to fluidly couple the actuator to a source of pressurized fluid and to a reservoir; and (iii) a pilot valve fluidly coupled to the source of pressurized fluid and the reservoir and configured to actuate the main valve. The pilot valve includes: (i) a valve body defining a first longitudinal cavity therein, where the valve body comprises: (a) a supply inlet configured to be fluidly coupled to the source of pressurized, fluid, and (b) an operating outlet configured to be fluidly coupled to the main valve, where the supply inlet and the operating outlet are disposed longitudinally on an exterior peripheral surface of the valve body; (ii) a cage disposed in the first longitudinal cavity coaxial with the valve body, where the cage includes (a) a first opening fluidly coupled to the supply inlet, and (b) a second opening fluidly coupled to the operating outlet, and wherein the cage defines a second longitudinal cavity therein; and (iii) a spool mounted within the second longitudinal cavity and configured to move axially therein, where when the pilot valve is actuated, the spool moves within the second longitudinal cavity to form a gap between an exterior peripheral surface of the spool and an interior peripheral surface of the cage, thereby allowing the pressurized fluid to flow from the supply inlet through the first opening, the gap, and the second opening to the operating outlet so as to actuate the main valve, and where a profile of the exterior peripheral surface of the spool changes along a length of the spool such that a flow area defined around the exterior peripheral surface of the spool changes upstream from the gap toward the first opening at a first rate of change, and the flow area changes downstream from the gap toward the second opening at a second rate of change that is different from the first rate of change.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
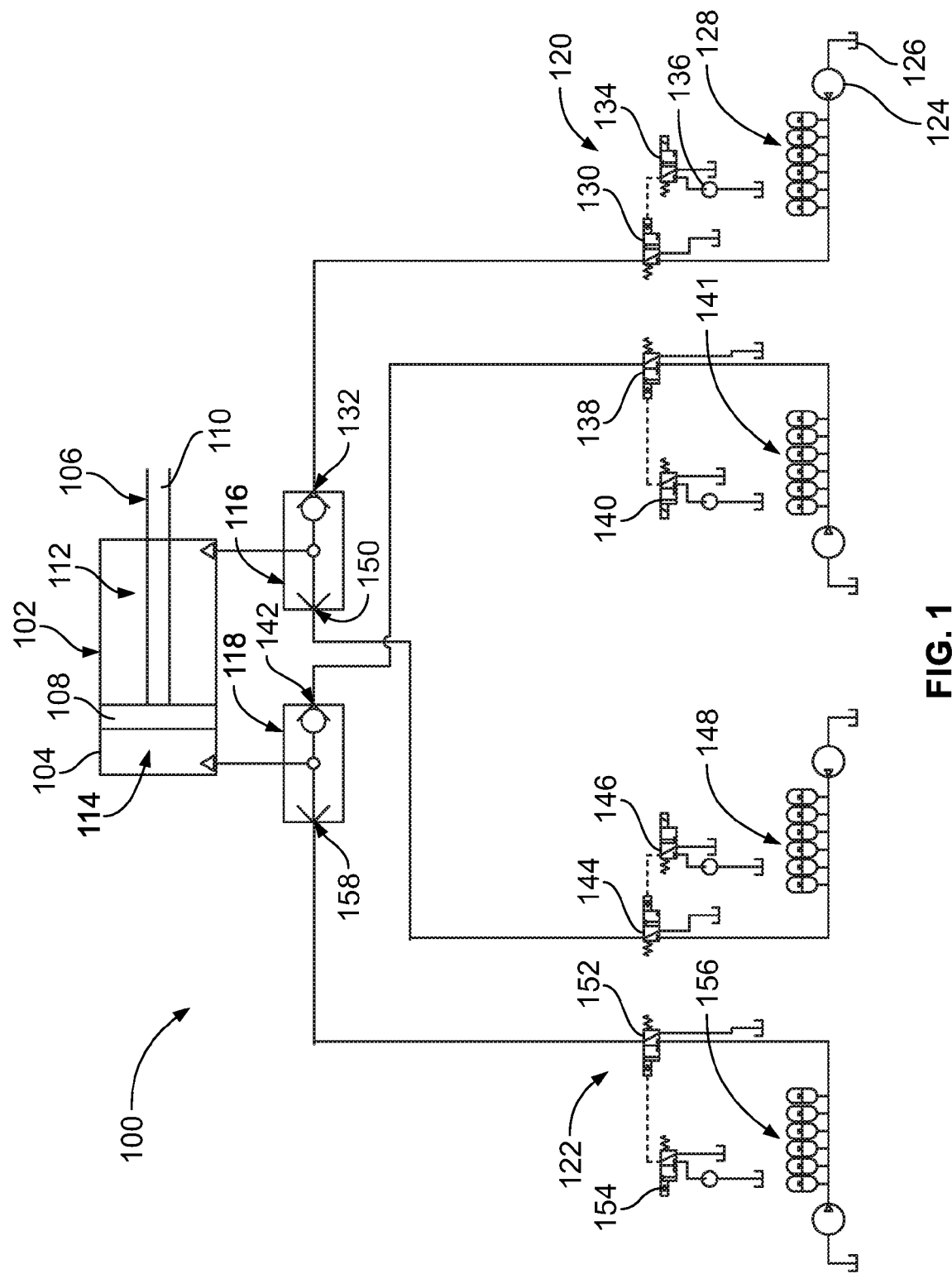
FIG. 1 illustrates a partial hydraulic system for a blowout preventer stack function, in accordance with an example implementation.

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

Subsea systems are used in offshore drilling to control and monitor oil and gas wells to prevent a blowout. In some cases, drilling occurs at remote locations and at deep water levels. These locations and deep water levels make maintenance of subsea systems challenging and hazardous. The subsea systems may include redundant and fail-safe equipment to reduce the likelihood of failure and downtime. Enhancing the reliability and durability of a component of a subsea equipment, even slightly, may improve the reliability and durability of the subsea equipment as a whole, thus reducing downtime and maintenance cost.

In examples, subsea equipment is used to perform various safety functions and operations. For example, a blowout preventer (BOP) stack involves various actuators to cope with erratic pressures and uncontrolled flow emanating from a well reservoir during drilling. In addition to controlling the downhole (occurring in the drilled hole) pressure and the flow of oil and gas, blowout preventers are intended to prevent tubing, tools and drilling fluid from being blown out of the wellbore.

A BOP stack may include several actuators (e.g., cylinders) controlled by corresponding valves. For example, the BOP stack may include a pipe ram that closes around a drill pipe restricting flow in an annulus area between the outside of a drill pipe and the wellbore, but does not obstruct flow within the drill pipe. The BOP stack may also include a blind or sealing ram, which has no openings for tubing, but can close off the well when the well does not contain a drill string or other tubing, and seal it. The BOP stack may further include a shear rain designed to shear the pipe in the well and seal the wellbore. The shear ram may have steel blades coupled to a piston of a hydraulic actuator and configured to shear the pipe and seal the annulus area between the outside of a drill pipe and the wellbore after shearing the pipe. The BOP stack may include several other actuators for other operations as well.

Thus, the BOP stack may be configured to perform several safety operations and monitor and maintain integrity of a well. In deep water applications, several BOP stacks could be used for redundancy. The actuators of the BOP stack may be controlled by valves that control communication of fluid to and from the actuator. If a valve fails, the actuator might not perform its operations properly, and costly maintenance and downtime may be incurred. Enhancing the reliability and durability of the valves multiplicatively enhances the reliability of the BOP stack as a whole.

Internal components of a valve may wear overtime due to cavitation occurring within the valve. Cavitation is more severe when a water-based fluid is used instead of hydraulic oil. In oil drilling environment, for example, water-glycol may be used because of its fire-resisting characteristics. If valve components wear due to cavitation, valve performance is negatively affected, which could affect performance of the actuator controlled by the valve. Replacing or maintaining the valve in a subsea environment is costly and might cause costly downtime for the associated equipment. Therefore, designing the valve to reduce the effects of cavitation and the resulting wear enhances the reliability and durability of the equipment and reduces the cost associated with maintenance and downtime.

Disclosed herein are valves and systems that may enhance durability of a valve by controlling the likelihood of occurrence and the location of cavitation within the valve. As such, wear due to cavitation may be reduced.

II. EXAMPLE HYDRAULIC SYSTEM

FIG. 1 illustrates a partial hydraulic system 100 for a BOP stack actuator, in accordance with an example implementation. The hydraulic system 100 includes an actuator 102 having a cylinder 104 and a piston 106. The actuator 102, may, for example, be associated with the ram shear operation of a BOP stack.

The piston 106 is slidably accommodated in the cylinder 104, and includes a piston head 108 and a rod 110 extending from the piston head 108 along a central axis direction of the piston 106. The piston head 108 divides the inside of the cylinder 104 into a first chamber 112 and a second chamber 114.

The hydraulic system 100 includes a retraction shuttle valve 116 that controls communication of fluid to the first chamber 112. Particularly, the retraction shuttle valve 116 controls whether to communicate fluid to the first chamber 112 from a first control pod 120 or a second control pod 122. The hydraulic system 100 also includes an extension shuttle valve 118 that controls communication of fluid to the second chamber 114. The extension shuttle valve 118 controls whether to communicate fluid to the second chamber 114 from the first control pod 120 or the second control pod 122.

The hydraulic system 100 may include the control pods 120 and 122 for redundancy. If one of the control pods 120 and 122 fails, the other control pod could operate the hydraulic actuator 102. Each of the control pods 120 and 122 includes power units configured to provide pressurized fluid to the hydraulic actuator 102.

For example, the control pod 120 includes a pump 124 configured to pressurize fluid from a tank 126 and provide the pressurized fluid to accumulators 128. The accumulators 128 are configured to then provide the pressurized fluid to a main valve 130 that control flow of the pressurized fluid to a first port 132 of the retraction shuttle valve 116. As an example, the accumulators 128 may be configured to provide the pressurized fluid at a pressure level of 5000 pounds per square inch (psi). However, other pressure levels are possible, such as between 2000-7000 psi.

Actuation of the main valve 130 is controlled by a pilot valve 134. The pilot valve 134 is configured to control a limited-flow control feed to the main valve 130, which controls the main flow feed from the accumulators 128 to the first port 132. For example, the pilot valve 134 may have a flow capacity of 2 gallons per minute (GM), whereas the main valve 130 may have a flow capacity of 200 GPM.

In an example implementation, another pump 136 may be configured to provide the limited-flow control feed to the pilot valve at a pressure level (e.g., 3000 psi) that is less than the pressure level (e.g., 5000 psi) in the accumulator 128. In another example, a pressure regulator circuit may be disposed between an outlet of the accumulators 128 and the inlet to the pilot valve 134. The pressure regulator circuit may include other valves configured to reduce the pressure level from the pressure level within the accumulators 128 to a reduced pressure level appropriate for the pilot valve. Thus, the pilot valve 134 controls a high pressure or high flow feed of the main valve 130 using a limited-flow and limited-pressure feed. When the pilot valve 134 is actuated, the main valve 130 is actuated, and pressurized fluid is communicated from the accumulators 128 to the first port 132 of the retraction shuttle valve 116.

The control pod 120 similarly has a main valve 138 and a pilot valve 140 that controls the main valve 138. The main valve 138 controls communication of pressurized fluid from accumulators 141 to a first port 142 of the extension shuttle valve 118.

In a similar configuration, the control pod 122 includes a main valve 144 controlled by a pilot valve 146 and configured to control communication of pressurized fluid from accumulators 148 to a second port 150 of the retraction shuttle valve 116. The control pod 122 may also include a main valve 152 controlled by a pilot valve 154 and configured to control communication of pressurized fluid from accumulators 156 to a second port 150 of the extension shuttle valve 118.

In operation, if the pilot valve 140 is actuated, the main valve 138 is also actuated and allows pressurized fluid to flow to the chamber 114 through the first port 142 of the extension shuttle valve 118, and the piston 106 extends. The fluid in the chamber 112 is discharged through an outlet port (not shown) coupled to the cylinder 104 to a reservoir. On the other hand, if the pilot valve 134 is actuated, the main valve 130 is also actuated and allows pressurized fluid to flow to the chamber 112 through the first port 132 of the retraction shuttle valve 116, and the piston 106 retracts. The fluid in the chamber 114 is discharged through an outlet port (not shown) coupled to the cylinder 104 to the reservoir.

If a failure occurs in the control pod 120, then the control pod 122 may operate the actuator 102. For instance, if the pilot valve 154 is actuated, the main valve 152 is also actuated and allows pressurized fluid to flow to the chamber 114 through the second port 158 of the extension shuttle valve 118, and the piston 106 extends. On the other hand, if the pilot valve 146 is actuated, the main valve 144 is also actuated and allows pressurized fluid to flow to the chamber 112 through the second port 150 of the retraction shuttle valve 116, and the piston 106 retracts.

In examples, the control pods 120 and 122 may be disposed in deep water. Failure of either of the control pods 120 and 122 could thus be costly and time consuming. One cause of failure in the control pods 120 and 122 may involve wear of internal components of the pilot valves 134, 140, 146, and 154. Wear of these internal components may lead to failure of the pilot valves and the hydraulic system 100 might not operate properly. For instance, failure of a pilot valve may lead to unintended actuation of a respective main valve without actuating the pilot valve, or may lead to no actuation of the respective main valve when actuating the pilot valve. Increasing the durability of the pilot valves may thus enhance the reliability and durability of the hydraulic system 100 as a whole, thus reducing maintenance, downtime, and the costs associated therewith.

One cause of failure of the pilot valves is wear resulting from cavitation. Cavitation is the formation of vapor cavities, i.e., small liquid-free zones ("bubbles" or "voids") in a liquid as a consequence of forces acting upon the liquid. Cavitation may occur when a liquid is subjected to rapid changes of pressure that cause the formation of bubbles where the pressure is relatively low. When subjected to higher pressure, the bubbles burst or implode and can generate an intense shock wave.

Cavitation could cause wear in a valve as the bursting bubbles implode near a metal surface of an internal component of the valve, resulting in cyclic stress through repeated implosion. This cyclic stress results in surface fatigue of the metal causing wear of the valve component.

Particularly, cavitation can occur in valves as pressurized fluid flows through a flow restriction, such as orifices, restricted openings, or ports in the valve. As the fluid flows through the flow restriction, the flow velocity increases at or just downstream of the flow restriction. The increase in flow velocity is accompanied by a decrease in the fluid pressure. If the pressure at the flow restriction drops below the vapor pressure of the fluid, the fluid may change from a liquid state to a vapor state, and bubbles may form in the flow stream. As the fluid flows away from the flow restriction to a larger flow area, the pressure may recover to a pressure that is once again above the vapor pressure, and the vapor bubbles may collapse. The collapsing bubbles causes wear of impacted components near the collapse location within the valve.

Further, the nature of the fluid flowing through the valve may affect the extent of cavitation. Particularly, the existence of water in the fluid increases the likelihood of occurrence of cavitation because the pressure and temperature levels that cause cavitation are reduced when water is present.

The hydraulic system 100 discussed above could be used in deep water oil and gas drilling locations. Water-glycol may be used as the pressurized fluid flowing through the various valves because water-glycol is a fire resistant fluid suitable for oil and gas drilling locations and environments. However, because of the water in the water-glycol fluid, the likelihood of occurrence of cavitation increases, and valve wear could occur.

Disclosed herein is a valve with a configuration that reduces occurrence of cavitation. The disclosed configuration of the valve could also cause cavitation bubble bursts to occur at a location away from components, the wear of which might affect performance of the valve and lead to its failure. Thus, the configuration disclosed herein may increase the valve life and reduce maintenance and downtime costs.

III. EXAMPLE VALVE

Figure 2:
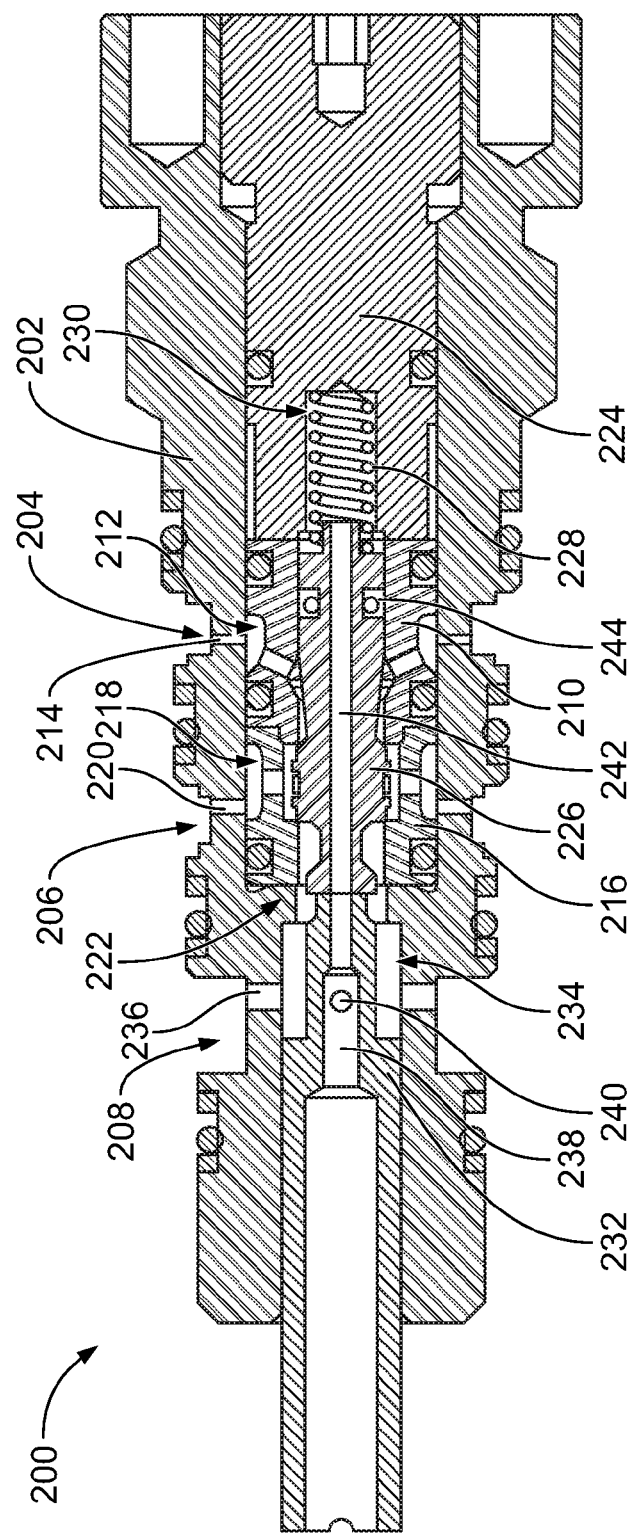
FIG. 2 illustrates a cross section of a valve, in accordance with an example implementation.

FIG. 2 illustrates a cross section of a valve 200, in accordance with an example implementation. The valve 200 could, for example, include any of the pilot valves 134, 140, 146, and 154. The valve 200 has a valve body 202 that defines a supply annular groove 204, a control or operating annular groove 206, and a vent annular groove 208. The annular grooves 204, 206, and 208 are disposed longitudinally on an external peripheral surface of the valve body 202. In examples, the annular grooves 204, 206, and 208 could be referred to as cavities. In other examples, instead of annular grooves, the valve body 202 may have ports or openings including at least a supply port, an operating port, and a vent port disposed along a length of the valve body 202.

The supply annular groove 204 may be fluidly coupled to a source of pressurized fluid (e.g., the pump 136 or the accumulators 128 through a pressure regulator circuit supplying pressurized fluid at 3000 psi to the valve 200). The operating annular groove 206 may be fluidly coupled to a control or inlet port of a main valve (e.g., the main valve 130) to provide pressurized fluid thereto and actuate the main valve. In other examples, the operating annular groove 206 may be fluidly coupled to a port of any hydraulic consumer (e.g., hydraulic cylinder, motor, etc.).

The vent annular groove 208 may be fluidly coupled to a tank or a reservoir (e.g., the tank 126) having fluid at a pressure lower than the pressure of fluid supplied by the source of pressurized fluid. For instance, the pressure in the tank could be 70-140 psi. As shown in FIG. 2, the operating annular groove 204 is disposed longitudinally between the operating annular groove 206 and the vent annular groove 208.

The valve body 202 defines a longitudinal cylindrical cavity therein. The longitudinal cylindrical cavity of the valve body 202 is configured to receive a first cage 210 coaxial with the valve body 202. The first cage has an annular cavity 212 on an exterior peripheral surface thereof. The pressurized fluid delivered to the supply annular groove 204 may be communicated to the annular cavity 212 through a channel 714 disposed in the valve body 202.

The valve 200 also includes a second cage 216 disposed in the longitudinal cylindrical cavity of the valve body 202 coaxial with the valve body 202 and the first cage 210. The second cage 216 is disposed longitudinally adjacent to the first cage 210 in the longitudinal cylindrical cavity within the valve body 202. The second cage 216 has an annular cavity 218 on an exterior peripheral surface thereof. The operating annular groove 206 is fluidly coupled to the annular cavity 218 via a channel 220. In examples, the first cage 210 and the second cage 216 could be combined into a single cage.

The annular cavities 212 and 218 could also be referred to as annular grooves. Further, in other example implementations, the first and second cage 210, 216 may include any other type of openings that communicate fluid instead of annular cavities or grooves.

A distal end of the second cage 216 is secured against a proximal end of the first cage 210, whereas a proximal end of the second cage 216 is secured against a shoulder 222 that protrudes radially inward from an interior peripheral surface of the valve body 202. With this configuration, the second cage 216 is retained between the first cage 210 and the shoulder 222.

A distal end of the first cage 210 is secured against a retainer 224 mounted in the longitudinal cylindrical cavity at a distal end of the valve body 202 and coaxial with the valve body 202. With this configuration, the first cage 210 is retained between the second cage 216 and the retainer 224. Herein, the term "distal end" refers to an end that is closer to an end of the valve body 202 where the retainer 224 is disposed, whereas "proximal end" refers to an end that is farther from the end of the valve body 202 where the retainer 224 is disposed.

In examples, the retainer 224 could be made of a high performance alloy such as Nitronic 60, which may include chromium, nickel, manganese, silicon, nitrogen, and iron. However, other materials are also possible.

The first cage 210 and the second cage 216 define a cavity therein that extends longitudinally within the first and second cages 210 and 216. A spool 226 is disposed in the cavity defined within the first and second cages 210 and 216, coaxial with the valve body 202 and the first and second cages 210 and 216. The spool 226 is configured to move axially in the cavity defined within the first and second cages 210 and 216.

The spool 226 narrows down toward a distal end thereof to be received within coils of a spring 228. The spring 228 is disposed in a blind longitudinal cavity 230 defined within the retainer 224.

A proximal end of the spool 226 interfaces with a distal end of a push pin 232. In examples, the retainer 224 could be made of a high performance alloy such as Nitronic 60. However, other materials are also possible.

The push pin 232 narrows down at its distal end such that an annular cavity 234 is formed between an exterior peripheral surface of the push pin 232 and an interior peripheral surface of the valve body 202. The annular cavity 234 is fluidly coupled to the vent annular groove 208 via a channel 236.

Further, the annular cavity 234 is in fluid communication with an internal longitudinal chamber 238, formed within the push pin 232, via at least one hole 240 disposed on an exterior surface of the push pin 232. The internal longitudinal chamber 238 is axially aligned and fluidly coupled with a longitudinal channel 242 formed within the spool 226. The channel 242 extends longitudinally throughout the spool 226 to the distal end of the spool 226. With this configuration, the blind longitudinal cavity 230 is fluidly coupled to a reservoir or tank through the longitudinal channel 242, the internal longitudinal chamber 238, the hole 240, the annular cavity 234, the channel 236, and the vent annular groove 208. If the proximal end of the push pin 232 is also in communication with the reservoir or tank coupled to the vent annular groove 208, the spool 226 would be a balanced spool because tank pressure would be applied to both ends of the spool 226.

The spool 226 may include an annular groove on its exterior peripheral surface to receive a piston seal 244. The piston seal 244 may prevent fluid leakage around the exterior surface of the spool 226 and to reduce friction as the spool 226 moves axially in the cavity defined within the first and second cages 210 and 216.

In examples, the valve 200 may be manually actuatable. In other examples, the valve 200 could be actuated electronically by way of a solenoid coupled to the push pin 232.

Figure 3:
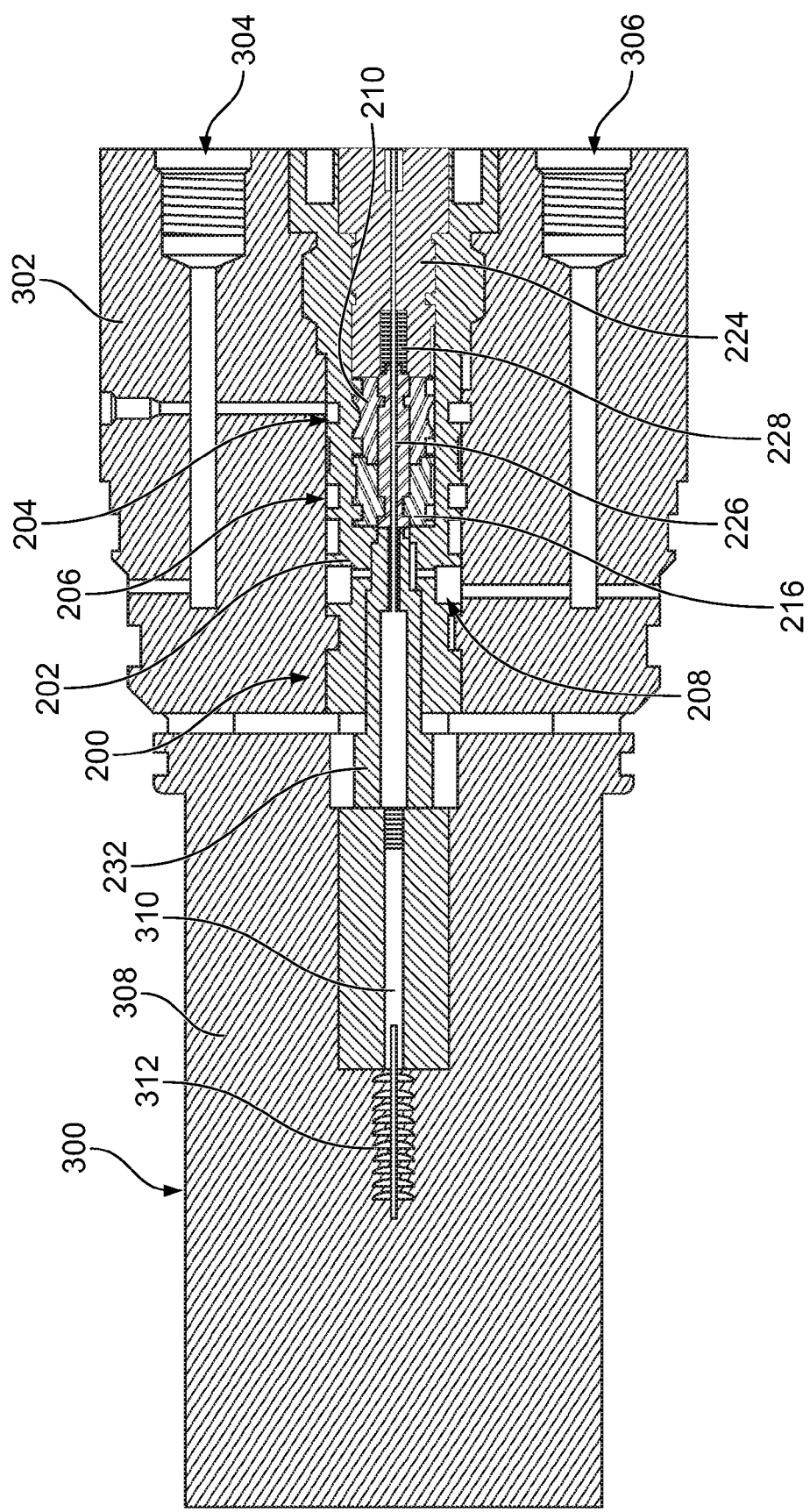
FIG. 3 illustrates a cross section of the valve of FIG. 2 coupled to a solenoid and inserted into a manifold, in accordance with another example implementation.

FIG. 3 illustrates a cross section of the valve 200 coupled to a solenoid 300 and inserted into a manifold 302, in accordance with an example implementation. The valve 200 is depicted in FIGS. 2 and 3 as a cartridge valve that can be inserted into the manifold 302. The manifold 302 may have a supply port 304 that hydraulically couples the manifold 302 and the supply annular groove 204 of the valve 200 to a source of pressurized fluid (e.g., a pump, accumulator, pressure regulator circuit, etc.). The manifold 302 may also include a vent or return port 306 that hydraulically couples the manifold 302 and the vent annular groove 208 of the valve 200 to a reservoir or tank. The manifold 302 may further include a control or operating port (not shown in the cross section of FIG. 3) that hydraulically couples the manifold 302 and the operating annular groove 206 of the valve 200 to an inlet port of a main valve to actuate the main valve.

The solenoid 300 includes a coil 308 that, when energized, causes a plunger 310 to move axially within the solenoid 300. A proximal end of the plunger 310 is received within coils of a spring 312 that sits in a blind cavity within the solenoid 300. A distal end of the plunger 310 is coupled to the push pin 232.

The valve 200 and the solenoid 300 are configured such that the spring 312 has a larger spring rate compared to the spring 228. As an example, the spring 312 may have a spring rate between 16 and 20 pounds of force per inch (lbs/in), whereas the spring 228 may have a spring rate of 8 lbs/in. However, if the coil 308 is energized, the solenoid 300 is configured to generate enough force to pull the plunger 310 proximally (to the left in FIG. 3) and overcome the force of the spring 312. The rates of the springs 312 and 228 are examples for illustration only, and other spring rates could be used.

With this configuration, without energizing the coil 308, the spring 312 pushes the plunger 310 and the push pin 232 coupled thereto distally (i.e., to the right in FIG. 3), thus pushing the spool 226 against the spring 228. In this un-energized state, the spool 226 rests against a seat disposed on an interior peripheral surface of the first cage 210 and blocks flow from the supply annular groove 204 to the operating annular groove 206 as described in more details below. However, when the spool 226 is in this position, fluid could flow from the operating annular groove 206 through an area formed between an exterior peripheral surface of the spool 226 and an interior peripheral surface of the second cage 216 to the vent annular groove 208.

When the coil 308 is energized, the plunger 310 is pulled proximally (to the left in FIG. 3) against the spring 312, thus allowing the spring 228 to push the spool 226 and the push pin 232 toward the solenoid 300. In this energized or open state, the spool 226 rests against a seat disposed on an interior peripheral surface of the second cage 216. In this position, fluid is allowed to flow from the supply annular groove 204 through an area formed between an exterior peripheral surface of the spool 226 and an interior peripheral surface of the first cage 210 to the supply annular groove 206.

Figure 4:
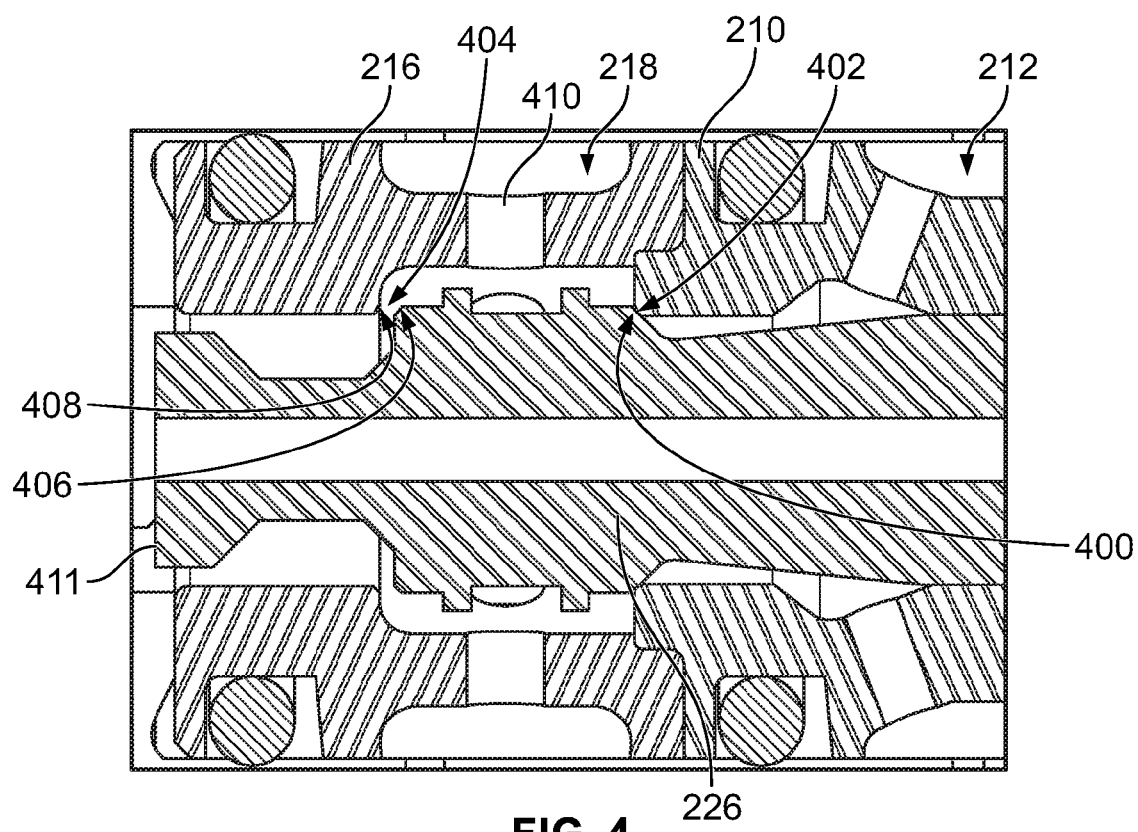
FIG. 4 illustrates a zoomed-in view of a partial cross section of the valve of FIG. 2 in an un-energized or closed state, in accordance with an example implementation.

FIG. 4 illustrates a zoomed-in view of a partial cross section of the valve 200 in an un-energized or closed state, in accordance with an example implementation. In the position shown in FIG. 4, the spool 226 is pushed by the spring 312 and the push pin 232 to seat on the first cage 210. Particularly, the spool 226 has a first annular chamfered seating surface 400 on an exterior peripheral surface thereof that mates with a corresponding annular chamfered seating surface 402 on an interior peripheral surface of the first cage 210. In this spool position, fluid received at the annular cavity 212 is blocked at the seating area between the spool 226 and the first cage 210.

Also, in this position, the spool 226 is unseated with respect to the second cage 216. Specifically, a gap 404 is formed between a second annular chamfered seating surface 406 on the exterior peripheral surface of the spool 226 and a corresponding annular chamfered seating surface 408 on an interior peripheral surface of the second cage 216. Thus, fluid received at the annular cavity 218 is allowed to flow through a channel 410 and the gap 404. The flow continues through an area formed between the exterior peripheral surface of the spool 226 and the interior peripheral surface of the second cage 216 toward the channel 236 and vent annular groove 208 shown in FIGS. 2 and 3. As shown in FIG. 4, the diameter of the spool 226 at an end an end 411 thereof is less than a diameter of the cavity within the second cage 216, thus allowing flow of fluid around the spool 226 toward the vent annular groove 208 shown in FIGS. 2 and 3.

Figure 5:
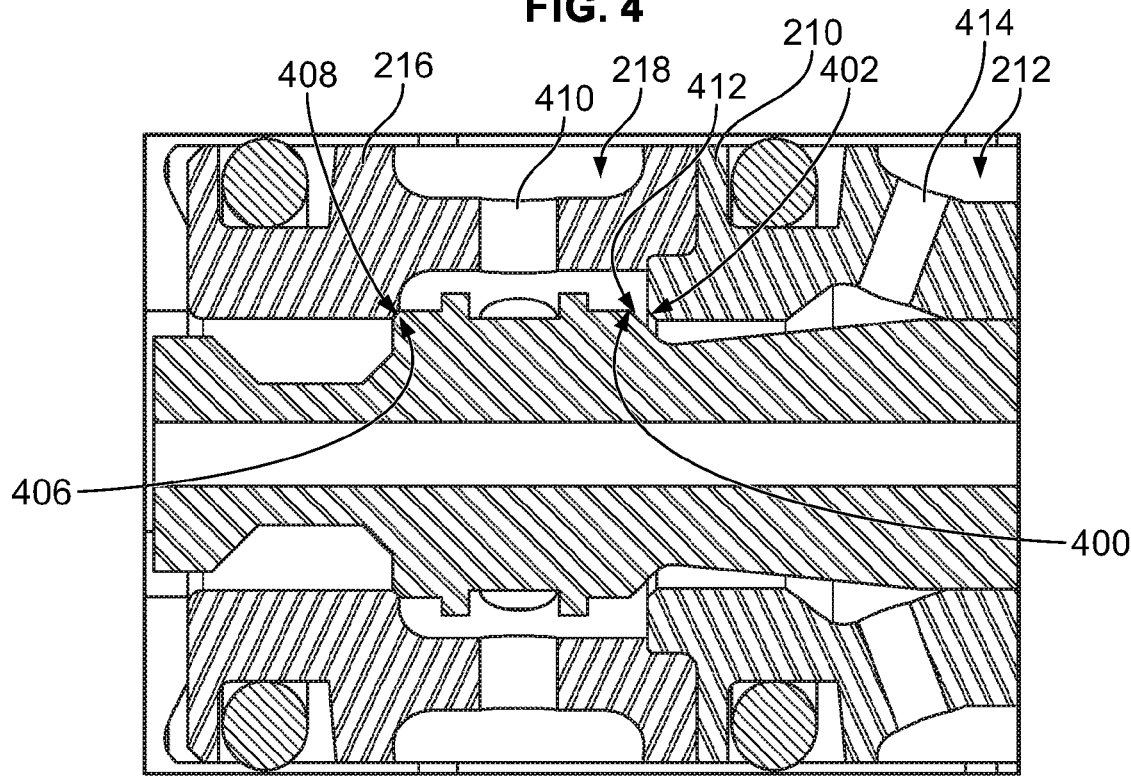
FIG. 5 illustrates a zoomed-in view of a partial cross section of the valve of FIG. 2 in an energized or open state, in accordance with an example implementation.

FIG. 5 illustrates a zoomed-in view of a partial cross section of the valve 200 in an energized or open state, in accordance with an example implementation. In the position shown in FIG. 5, the spool 226 is pushed by the spring 228 to seat on the second cage 216. Particularly, the second annular chamfered seating surface 406 mates with the corresponding annular chamfered seating surface 408, thus blocking flow thereat.

Also, in this spool position, the spool 226 is unseated with respect to the first cage 210. Specifically, a gap 412 is formed between the first annular chamfered seating surface 400 of the spool 226 and the corresponding annular chamfered seating surface 402 of the second cage 216. Thus, fluid received at the annular cavity 212 is allowed to flow through a channel 414 and the gap 412. The flow continues through an area formed between the exterior peripheral surface of the spool 226 and the interior peripheral surface of the second cage 216 toward the channel 410 and annular cavity 218, and ultimately to the operating annular groove 206 shown in FIGS. 2 and 3.

If cavitation bubbles formed in the fluid are allowed to burst near or within the gap 412, the implosion could cause wear of the seating surface 402 on the first cage 210 and the seating surface 400 of the spool 226. This wear could cause the spool 226 to not seat properly on the first cage 210 when the valve is in the un-energized or closed state. The improper seating could allow unintended leakage flow from the supply annular groove 204 to the operating annular groove 206, and could unintentionally actuate a main valve actuatable by the valve 200.

The geometry of the valve 200 depicted in FIGS. 2-5 may reduce the likelihood of formation of cavitation bubbles. Further, the geometry may force the bubbles to burst upstream or downstream from the seating surfaces 400 and 402, as opposed to near or thereat, to preclude wear of the seating surfaces 400 and 402.

Figure 6A:
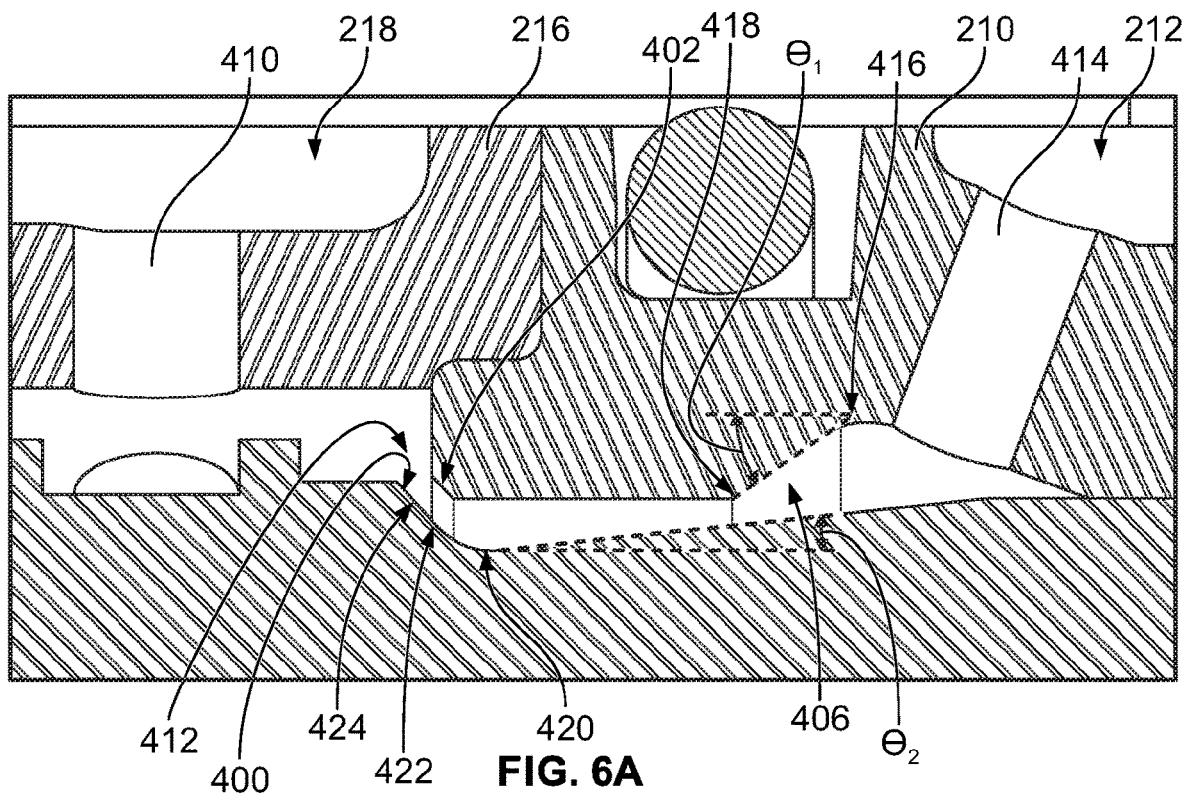
FIG. 6A illustrates a zoomed-in view of a cross section of a spool, a first cage, and a second cage, in accordance with an example implementation.

FIG. 6A illustrates a zoomed-in view of a cross section of the spool 226, the first cage 210, and the second cage 216, in accordance with an example implementation. As shown in FIG. 6A, the fluid flowing through the annular cavity 212 and the channel 414 enters a flow area formed between the exterior peripheral surface of the spool 226 and the interior peripheral surface of the first cage 210. As shown, the interior peripheral surface of the first cage 210 tapers at an angle $\theta_1$ starting at a point 416 until a point 418. The flow area through which the fluid flows thus decreases from the entry point 416 until the point 418, and therefore the flow velocity might increase and the pressure might decrease at the point 418. However, because of the gradual reduction of the flow area, as opposed to an abrupt reduction thereof, the likelihood of formation of cavitation bubbles may be reduced.

After the point 418, the interior peripheral surface of the first cage 210 does not taper, and thus the diameter of the interior peripheral surface of the first cage 210 may remain substantially constant. However, as shown in FIG. 6A, the exterior peripheral surface of the spool 226 tapers inwardly at an angle $\theta_2$, and thus the flow area between the spool 226 and the first cage 210 increases gradually between the point 418 and a point 420. This gradual increase in the flow area may cause the flow velocity to decrease and the pressure to increase. This increase in pressure may cause cavitation bubbles that formed earlier in the fluid to burst prior to reaching the gap 412 and affecting the seating surfaces 400 and 402.

Further, after the point 420, the diameter of the exterior peripheral surface of the spool 226 increases gradually, and thus the flow area between the spool 226 and the first cage 210 decreases toward the gap 412 until point 422, which is the entry point into the gap 412. The flow area remains substantially the same as the fluid flows through the gap 412 from the point 422 to a point 424, which is a departure point from the gap 412. Thereafter, the flow area increases rapidly as the fluid enters the flow area around the spool 226 downstream from the gap 412.

Figure 6B:
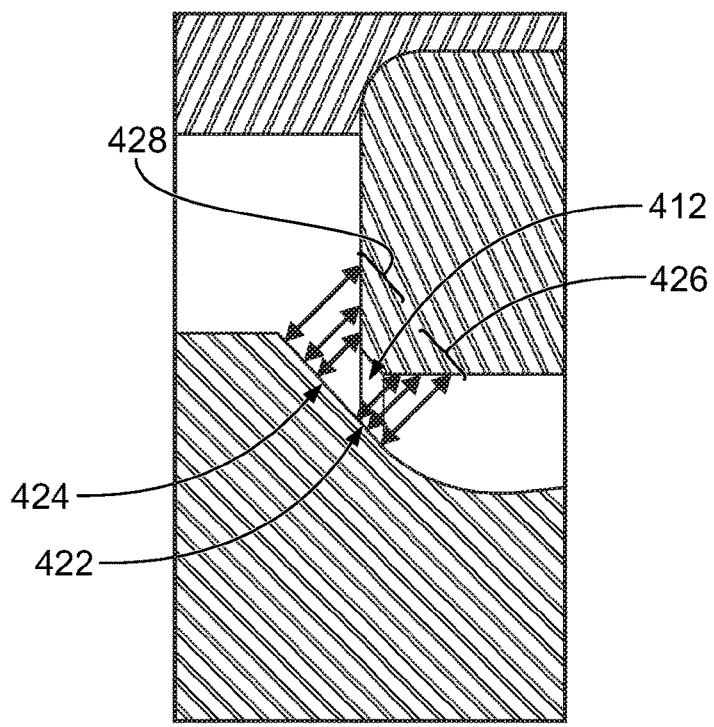
FIG. 6B illustrates a difference in a rate of change of a flow area between an upstream direction and a downstream direction from a gap between a spool and a cage, in accordance with an example implementation.

FIG. 6B illustrates the difference in the rate of change of the flow area between the upstream direction and the downstream direction from the gap 412, in accordance with an example implementation. Arrow group 426 illustrates the gradual change of the flow area upstream of the gap 412, whereas arrow group 428 illustrates the gradual change of the flow area downstream of the gap 412. The length of each double-headed arrow in the arrow groups 426 and 428 represents a magnitude of the flow area at the location of the arrow.

As shown, the flow area is smallest at the gap 412, and is substantially the same at the entry point 422 of the gap 412 and the departure point 424 from the gap 412. This is represented by the two double-headed arrows of equal length at the entry point 422 and departure point 424. The flow area gradually changes upstream as represented by the changes in the lengths of the double-headed arrows of the arrow group 426. The flow area also gradually changes downstream as represented by the changes in the lengths of the double-headed arrows of the arrow group 428. However, the rate of gradual increase in the upstream direction, i.e., the rate of change in lengths of the double-headed arrows of the arrow group 426, is less than the rate of gradual increase downstream, i.e., the rate of change in lengths of the double-headed arrows of the arrow group 428.

In this manner, because of the difference in the rate of change of the flow area, the cavitation bubbles that might have formed in the fluid and had not burst prior to reaching the gap 412, may be carried or channeled unburst with the flow to an area downstream from the gap 412. If the bubbles then burst downstream from the gap 412, then the implosion effects, i.e., wear, might not occur at the seating surfaces 400 and 402, but downstream thereof and damage to the seating surfaces 400 and 402 may be reduced or eliminated. The seating surfaces 400 and 402 may thus properly mate allowing the valve 200 to operate properly.

The configuration of the cages 210, 216, and the spool 226 is an example implementation for illustration, and other configurations could be implemented. For instance, as mentioned above, the first cage 210 and the second cage 216 could be combined into a single cage. In this case, the single cage could have the annular cavity 212 and the annular cavity 218 disposed on an exterior peripheral surface thereof. The seating surfaces 402 and 408 would both be disposed on an interior peripheral surface of the cage. Other example configurations are possible.

In example implementations, the chamfer angle of the seating surface 400 is the same or substantially the same as, i.e., within a threshold number of degrees such as ±0.5° from, the chamfer angle of the seating surface 402. Similarly, the chamfer angle of the seating surface 406 is the same or substantially the same as the chamfer angle of the seating surface 408. Having the chamfer angles being the same or substantially the same may streamline the flow of the fluid through the gaps 404 and 412. This streamlining may reduce the likelihood of formation of bubbles within the fluid, and may further reduce the volume of the vapor formed within the fluid as it passes through the gaps 404 and 412.

In addition to the geometric profile of the spool 226 and the cages 210 and 216 contributing to reduction in cavitation effects, the material from which these components are made may be selected so as to resist wear resulting from cavitation. For example, the spool 226 and cages 210, 216 may be made from a range of cobalt-chromium alloys designed for wear resistance. These alloys may include other elements such as tungsten or molybdenum and a small amount of carbon (e.g., 0.9%4.4%). As a specific example, the spool 226 and the cages 210, 216 could be made of a cobalt 6B alloy, which is a cobalt based chromium tungsten alloy. A cobalt 6B alloy provides resistance to cavitation because it can withstand impact and thermal shocks similar to those resulting from cavitation. Cobalt 6B also has a low coefficient of friction and may prevent galling and abrasion when two chamfered surfaces of the spool 226 and one of the cages 210 and 216 contact each other.

IV. CONCLUSION

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
a valve body defining a first longitudinal cavity therein, wherein the valve body comprises: (i) a supply annular groove configured to be fluidly coupled to a source of pressurized, fluid, and (ii) an operating annular groove configured to be fluidly coupled to another valve, wherein the supply annular groove and the operating annular groove are disposed longitudinally on an exterior peripheral surface of the valve body;
a cage disposed in the first longitudinal cavity coaxial with the valve body, wherein the cage includes (i) a first opening fluidly coupled to the supply annular groove, and (ii) a second opening fluidly coupled to the operating annular groove, and wherein the cage defines a second longitudinal cavity therein; and
a spool mounted within the second longitudinal cavity and configured to move axially therein, wherein when the valve is actuated, the spool moves within the second longitudinal cavity to form a gap between an exterior peripheral surface of the spool and an interior peripheral surface of the cage, thereby allowing the pressurized fluid to flow from the supply annular groove through the first opening, the gap, and the second opening to the operating annular groove, and wherein a profile of the exterior peripheral surface of the spool changes along a length of the spool such that a flow area defined around the exterior peripheral surface of the spool increases upstream from the gap toward the first opening at a first rate of change, and the flow area increases downstream from the gap toward the second opening at a second rate of change that is different from the first rate of change.

2. The valve of claim 1, wherein the second rate of change is greater than the first rate of change.

3. The valve of claim 1, wherein further upstream toward the first opening, the exterior peripheral surface of the spool tapers such that the flow area changes at a third rate of change different from the first rate of change.

4. The valve of claim 1, wherein the cage has a first annular groove and a second annular groove disposed on the exterior peripheral surface of the cage, wherein the first annular groove comprises the first opening, and wherein the second annular groove comprises the second opening.

5. The valve of claim 1, wherein the cage includes a channel configured to communicate the pressurized fluid received at the first opening to the flow area defined between the exterior peripheral surface of the spool and the interior peripheral surface of the cage, wherein the interior peripheral surface of the cage tapers downstream from the channel to gradually decrease the flow area.

6. The valve of claim 1, wherein the valve body further comprises: a vent annular groove disposed longitudinally on the exterior peripheral surface thereof and configured to be fluidly coupled to a reservoir.

7. The valve of claim 6, wherein the operating annular groove is disposed longitudinally between the supply annular groove and the vent annular groove.

8. The valve of claim 6, wherein when the valve is actuated, the spool seats on an interior peripheral surface of the cage so as to block flow from the operating annular groove around the spool to the vent annular groove.

9. The valve of claim 8, wherein the spool includes an annular chamfered seating surface on the exterior peripheral surface thereof configured to mate with a corresponding annular chamfered seating surface on the interior peripheral surface of the cage so as to seat the spool on the interior peripheral surface of the cage.

10. The valve of claim 9, wherein the annular chamfered seating surface of the spool and the corresponding annular chamfered seating surface of the cage are chamfered at substantially the same angle.

11. The valve of claim 1, wherein when the valve is unactuated, the spool seats on an interior peripheral surface of the cage so as to block flow from the supply annular groove around the spool to the operating annular groove.

12. The valve of claim 11, wherein the spool includes an annular chamfered seating surface on the exterior peripheral surface thereof configured to mate with a corresponding annular chamfered seating surface on the interior peripheral surface of the cage to seat the spool on the interior peripheral surface of the cage, and wherein the annular chamfered seating surface of the spool and the corresponding annular chamfered seating surface of the cage are chamfered at substantially the same angle.

13. A valve comprising:
a valve body defining a first longitudinal cavity therein, wherein the valve body comprises: (i) a supply annular groove configured to be fluidly coupled to a source of pressurized, fluid, and (ii) an operating annular groove configured to be fluidly coupled to a hydraulic consumer, wherein the supply annular groove and the operating annular groove are disposed longitudinally on an exterior peripheral surface of the valve body;
a first cage disposed in the first longitudinal cavity, wherein the first cage includes a first opening fluidly coupled to the supply annular groove;
a second cage disposed longitudinally adjacent to the first cage in the first longitudinal cavity, wherein the second cage includes a second opening fluidly coupled to the operating annular groove, and wherein the first cage and the second cage define a second longitudinal cavity therein and extending therebetween; and
a spool mounted within the second longitudinal cavity and configured to move axially therein, wherein when the valve is actuated, the spool moves within the second longitudinal cavity to form a gap between an exterior peripheral surface of the spool and an interior peripheral surface of the first cage, thereby allowing the pressurized fluid to flow from the supply annular groove through the first opening, the gap, and the second opening to the operating annular groove, and wherein a profile of the exterior peripheral surface of the spool changes along a length of the spool such that a flow area defined around the exterior peripheral surface of the spool changes upstream from the gap toward the first opening at a first rate of change, and the flow area changes downstream from the gap toward the second opening at a second rate of change that is different from the first rate of change.

14. The valve of claim 13, wherein the flow area increases upstream at the first rate of change and the flow area increases downstream at the second rate of change, and wherein the second rate of change is greater than the first rate of change.

15. The valve of claim 13, wherein the valve body further comprises: a vent annular groove disposed longitudinally on the exterior peripheral surface thereof and configured to be fluidly coupled to a reservoir, wherein the operating annular groove is disposed longitudinally between the supply annular groove and the vent annular groove, and wherein when the valve is actuated, the spool seats on an interior peripheral surface of the second cage so as to block flow from the operating annular groove around the spool to the vent annular groove.

16. The valve of claim 13, wherein when the valve is unactuated, the spool seats on the interior peripheral surface of the first cage so as to block flow from the supply annular groove around the spool to the operating annular groove, wherein the spool includes an annular chamfered seating surface on the exterior peripheral surface thereof configured to mate with a corresponding annular chamfered seating surface on the interior peripheral surface of the first cage to seat the spool thereon, and wherein the annular chamfered seating surface of the spool and the corresponding annular chamfered seating surface of the cage are chamfered at substantially the same angle.

17. A hydraulic system comprising:
an actuator;
a main valve configured to fluidly couple the actuator to a source of pressurized fluid and to a reservoir; and
a pilot valve fluidly coupled to the source of pressurized fluid and the reservoir and configured to actuate the main valve, wherein the pilot valve comprises:
a valve body defining a first longitudinal cavity therein, wherein the valve body comprises: (i) a supply inlet configured to be fluidly coupled to the source of pressurized, fluid, and (ii) an operating outlet configured to be fluidly coupled to the main valve, wherein the supply inlet and the operating outlet are disposed longitudinally on an exterior peripheral surface of the valve body,
a cage disposed in the first longitudinal cavity coaxial with the valve body, wherein the cage includes (i) a first opening fluidly coupled to the supply inlet, and (ii) a second opening fluidly coupled to the operating outlet, and wherein the cage defines a second longitudinal cavity therein, and
a spool mounted within the second longitudinal cavity and configured to move axially therein, wherein when the pilot valve is actuated, the spool moves within the second longitudinal cavity to form a gap between an exterior peripheral surface of the spool and an interior peripheral surface of the cage, thereby allowing the pressurized fluid to flow from the supply inlet through the first opening, the gap, and the second opening to the operating outlet so as to actuate the main valve, and wherein a profile of the exterior peripheral surface of the spool changes along a length of the spool such that a flow area defined around the exterior peripheral surface of the spool changes upstream from the gap toward the first opening at a first rate of change, and the flow area changes downstream from the gap toward the second opening at a second rate of change that is different from the first rate of change.

18. The hydraulic system of claim 17, wherein the actuator is one actuator of a plurality of actuators of a blowout preventer stack, and wherein the main valve is configured to control communication of the pressurized fluid to a shuttle valve coupled to a chamber of the actuator.

19. The hydraulic system of claim 17, wherein the flow area increases upstream at the first rate of change and the flow area increases downstream at the second rate of change, and wherein the second rate of change is greater than the first rate of change.

* * * * *